O. CZARAN.
PLATFORM ADJUSTING DEVICE FOR HARVESTERS.
APPLICATION FILED FEB. 10, 1917.

1,299,686.

Patented Apr. 8, 1919.
2 SHEETS—SHEET 1.

WITNESS
F. Raue.

INVENTOR.
Otto Czaran
BY Sigmund Herzog
his ATTORNEY

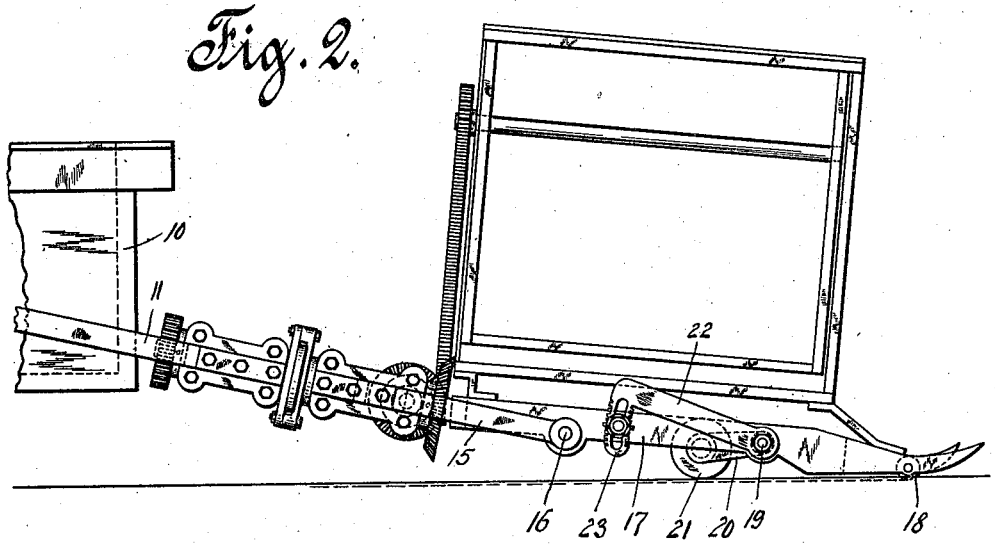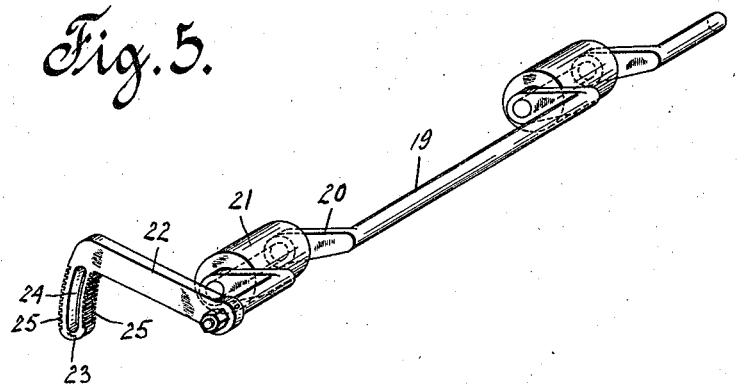

UNITED STATES PATENT OFFICE.

OTTO CZARAN, OF GLENDALE, NEW YORK.

PLATFORM-ADJUSTING DEVICE FOR HARVESTERS.

1,299,686.  Specification of Letters Patent.  Patented Apr. 8, 1919.

Original application filed March 9, 1914, Serial No. 823,601. Divided and this application filed February 10, 1917. Serial No. 147,820.

*To all whom it may concern:*

Be it known that I, OTTO CZARAN, a subject of the King of Hungary, and a resident of Glendale, in the county of Queens and State of New York, have invented certain new and useful Improvements in Platform-Adjusting Devices for Harvesters, of which the following is a specification.

The present invention relates to grain harvesters, and more particularly to adjusting devices for the platforms thereof; this application being divided out of application for U. S. Letters Patent filed Mar. 9, 1914, under Ser. No. 823,601, which has resulted in Patent No. 1,215,916, issued Feb. 13, 1917.

The main object of the invention is to provide a device that is simple in construction, efficient in operation, and which can be conveniently actuated to raise or lower, at will, the platform of the harvesting machine.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
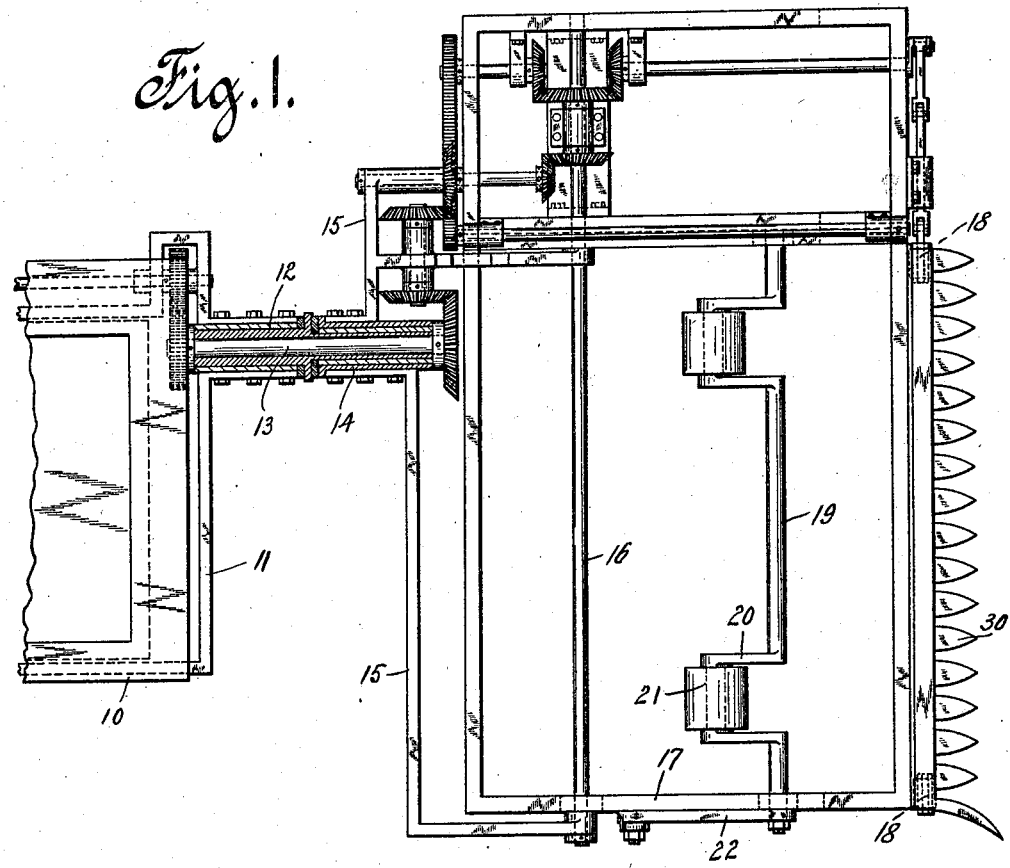
Figure 3:
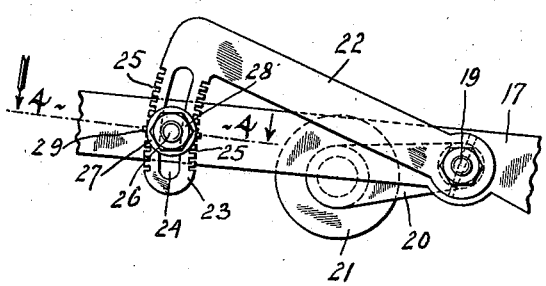
Figure 4:
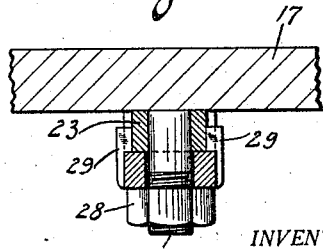

Figure 1 is a plan view of a portion of a grain harvester and its platform, with the adjusting means shown thereon; Fig. 2 is a side elevation of the device shown in Fig. 1; Fig. 3 is a side elevation, on a larger scale, of the platform adjusting means; Fig. 4 is a section taken on line 4—4 of Fig. 3; and Fig. 5 is a perspective view of part of the platform adjusting mechanism.

In the drawings the numeral 10 indicates a portion of the frame of a harvesting machine, to which is pivoted (at points not shown) a substantially oblong shaped bracket 11. This bracket embraces, as it were, part of the frame, and carries a bearing 12, through which extends a spindle 13. Over the bearing is drawn a sleeve 14, which is adapted to oscillate upon said bearing. To the sleeve are attached arms 15, which carry a horizontally arranged supporting rod 16, upon which is oscillatably disposed an elevator platform frame 17. This platform is, as usual, oblong in configuration, and supports the platform canvas of the usual shape and construction (not shown in the drawings).

The platform frame rests on rollers 18, which are in any suitable manner mounted on the underface and near the front edge of said platform. A transverse shaft 19 is oscillatably journaled in the platform frame 17 and provided with cranks 20, upon which are mounted rollers 21. To one end of the shaft 19 is fixedly attached a lever 22, that is provided with a downwardly projecting extension 23, having an arc-shaped slot 24, and in both of its sides notches 25. In the slot 24 is seated a screw-bolt 26, that is mounted upon the platform frame, a washer 27 being interposed between a nut 28, having screw-threads meshing with those of the screw-bolt, and the said extension 23. This washer is provided with lugs 29, which are adapted to enter the notches 25 in the extension 23. The reciprocating knife of the cutting mechanism is indicated by the numeral 30. A detailed description of the actuating mechanism of this knife is deemed to be unnecessary, as it does not form part of the present invention.

The operation of this device is as follows: If a deep cut is to be made, the platform of the harvester is permitted to rest upon the rollers 18. If it is intended to raise the platform, that is to say to swing it around the supporting rod 16, in order to change the height of the cut of the harvester, the nut 28 is loosened to permit the lugs 29 upon the washer 27 to be disengaged from the notches 25 in the extension 23 of the lever 22. After this has been done, the shaft 19 is given a partial turn in its bearings by forcing the lever 22 downward, whereby the cutting mechanism of the harvester is raised. The lugs of the washer are then brought into engagement with the proper notches 25 in the extension 23, and the nut properly tightened. In this manner any predetermined height of cut can be obtained. It is to be observed that the platform rests, under all circumstances, on the rollers 21, and is thus always properly supported.

Attention is called to the fact that, while herein a particular way has been specified for connecting the platform of the harvester with the frame thereof, any other means may be used without departing from the invention, which lies mainly in the provision of supporting rollers for the platform, which rollers are mounted upon arms or cranks of a shaft, that is oscillatably journaled on the platform of the harvester.

What I claim is:

1. In a harvesting machine, the combination with a main frame, of a platform hinged thereto, a transverse shaft mounted upon said platform having crank arms intermediate its ends, rollers carried by said arms, each roller having a diameter that is smaller than the length of its respective crank arm, and a single means for varying the angular position of said arms relative to the plane of said platform.

2. In a harvesting machine, the combination with a main frame, of a platform hinged thereto provided with a cutting mechanism, rollers at the front edge of said platform in rear of said cutting mechanism, a transverse shaft mounted upon said platform having crank arms intermediate its ends, rollers carried by said arms, each roller having a diameter that is smaller than the length of its respective crank arm, and a single means for varying the angular position of said arms relative to the plane of said platform, said first-named rollers being smaller than the rollers on said crank arms.

Signed at New York, in the county of New York, and State of New York, this 3rd day of Feb., A. D. 1917.

OTTO CZARAN.

Copies of this patent may be obtained for five cents each, by addressing the "Commissioner of Patents, Washington, D. C."